United States Patent [19]
Nicholson

[11] 3,817,249
[45] June 18, 1974

[54] STEREOTAXIC INSTRUMENT
[75] Inventor: Michael Kennedy Nicholson, Bethesda, Md.
[73] Assignee: Neuro Probe, Inc., Bethesda, Md.
[22] Filed: Apr. 7, 1972
[21] Appl. No.: 242,006

[52] U.S. Cl............. 128/303 B, 248/124, 248/285
[51] Int. Cl........................................... A61b 19/00
[58] Field of Search............ 33/1 M, 174 D, 180 R; 128/303 B; 125/11 GA; 248/124, 125, 221, 298, 279, 285, 287

[56] References Cited
UNITED STATES PATENTS

| | | | |
|---|---|---|---|
| 2,767,003 | 10/1956 | Gilmont | 248/124 X |
| 2,940,783 | 6/1960 | Engelhardt | 248/124 X |
| 3,061,936 | 11/1962 | DeDobbeleer | 33/174 D |
| 3,073,310 | 1/1963 | Mocarski | 128/303 B |
| 3,118,695 | 1/1964 | Engelhardt | 248/124 X |
| 3,130,633 | 4/1964 | Rantsch | 33/276 X |

FOREIGN PATENTS OR APPLICATIONS

| | | | |
|---|---|---|---|
| 1,282,623 | 12/1961 | France | 128/303 B |
| 166,998 | 1/1965 | U.S.S.R. | 128/303 B |

OTHER PUBLICATIONS
Ellsworth, O. T. and Lilienfeld, L. S., Direct–Reading Stereotaxic Instrument. In Federation Proc., 1968, $27^2$: 277.

Primary Examiner—Channing L. Pace
Attorney, Agent, or Firm—Snyder, Brown & Ramik

[57] ABSTRACT

A chronically fixed stereotaxic device for intracerebral exploration with electrodes or other probes. A headpiece or platform is provided which features an enlarged opening providing direct access to the dura or skull of the research animal. A removable gridplate is located in covering relation to the opening and one or more swivel blocks mounting electrode drives is supported on the headpiece so that electrodes may be properly positioned with the gridplate in place whereafter the gridplate is removed and the electrode or electrodes are plunged and adjusted to the desired Horsely-Clarke coordinate positions. A swivel block and electrode drive assembly is also disclosed which allows an electrode to be plunged at an acute angle to the vertical Horsely-Clarke axis to allow an electrode angularly to reach a desired Horsely-Clarke coordinate position.

5 Claims, 13 Drawing Figures 3,817,249

STEREOTAXIC INSTRUMENT

BACKGROUND OF THE INVENTION

Current neurophysiological research devices include various platform or headpiece arrangements which are chronically fixed to a research animal offering the capability of electrode placement and electrical connection access points which remain fixed and are carried about by the animal without substantial restraint or restriction to its normal movement. Such instruments normally are fixed to an exposed portion of the animal's skull by means of acrylic materials of the type principally developed for dental use, and it is usual in such chronic devices that some type of gridplate or electrode-placement template is fixed permanently, in known relation to the Horsely-Clarke coordinate system, over the relevant portion of the skull. As a result, there is no visual access to the animal's brain and electrode placement involves drilling through the gridplate and the skull to allow later plunging of an electrode and adjustment thereof to the desired Horsely-Clarke coordinate point. Examples of such arrangements are to be found in a description submitted by O. T. Ellsworth and L. S. Lilienfield in Federation Proceedings 1968, Vol. 27, No. 2 and relating to NIH Grant MH 12095, and in the publication by Dr. Paul D. MacLean in Electroencephalography and Clinical Neurophysiology, 1967, 22:180–182, Elseview Publishing Company, Amsterdam, The Netherlands (reprinted by the U.S. Department of Health, Education and Welfare, NIH). The work of Horsley and Clark appeared in the British Medical Journal 2:1,799–1,800, 1906 and in Brain 35: 45 – 124, 1908.

BRIEF SUMMARY OF THE INVENTION

Of principal concern in connection with this invention is the provision of an improved form of chronic stereotaxic instrument which incorporates a removable gridplate allowing proper pre-plunging placement of electrodes whereafter the gridplate may be removed to gain direct access to the animal's dura or skull; the provision of an improved form of intracerebral exploratory electrode drive and mounting assembly including a swivel block, a rotatable and/or sliding radial arm carried by the swivel block, and an electrode drive carried by the radial arm; and the provision of an improved form of final positioning arrangement for the electrodes.

BRIEF DESCRIPTION OF THE DRAWING FIGURES

DETAILED DESCRIPTION OF THE INVENTION

Figure 1:
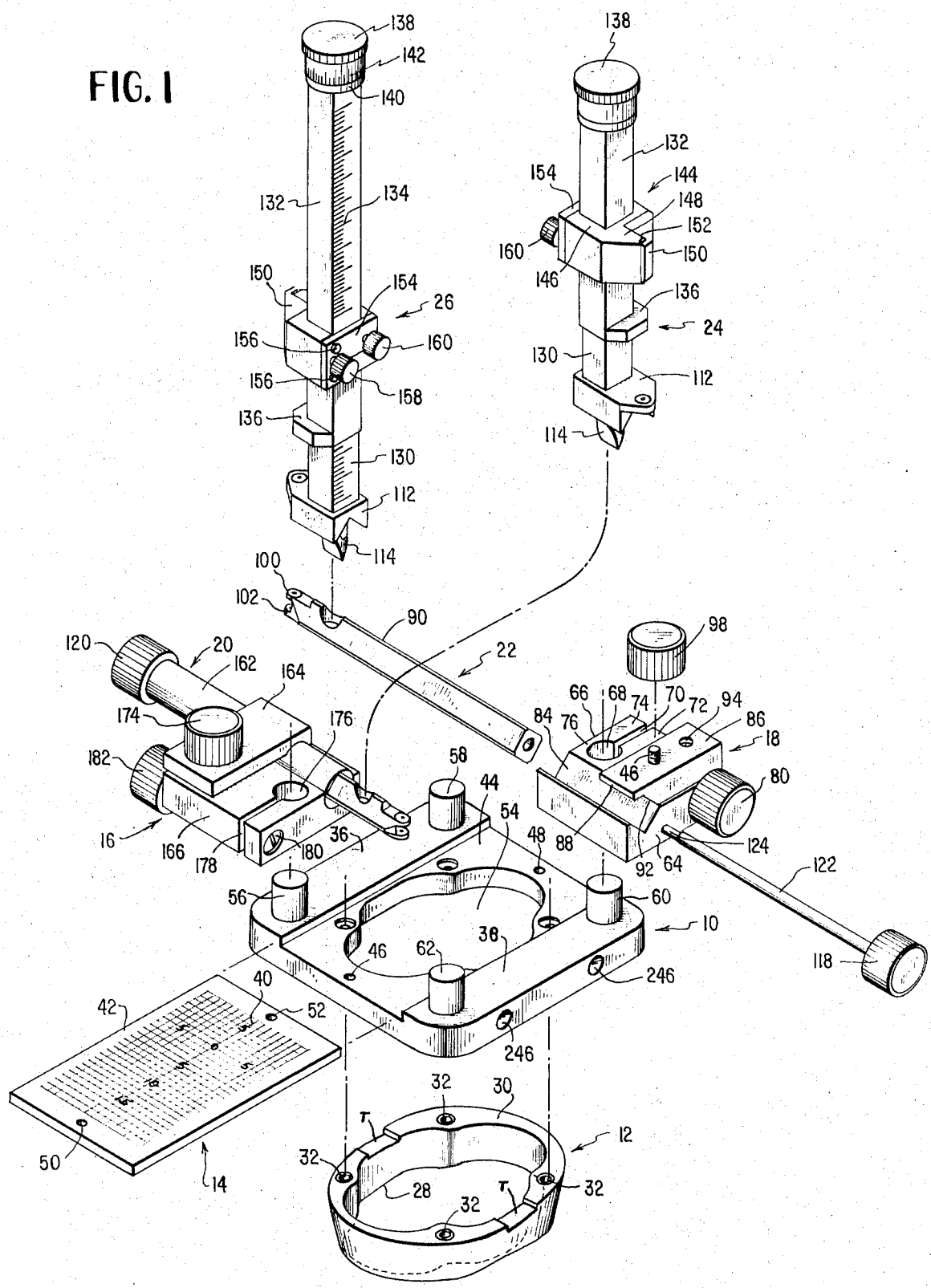
FIG. 1 is an exploded perspective view illustrating the principal component parts of the stereotaxic instrument according to the present invention.

With reference to the assembly as is shown in FIG. 1, the platform or head piece assembly is indicated therein generally by the reference character 10 and is adapted to be mounted on an adapter assembly 12 which, in turn, is fixedly secured to the skull of the research animal. The platform has a gridplate assembly associated with it adapted to be removably attached in positively and fixed thereto as will hereinafter appear. The assembly is indicated generally by the reference characters 16 and 18 are swivel block assemblies having respective radial or sliding arms 20 and 22 associated therewith and electrode drive assemblies shown respectively at 24 and 26 are associated with the respective arms 20 and 22 in removably fixed relationship thereto. These various components constitute a complete operative assembly whereby electrodes for intracerebral exploration may be plunged into the animal's brain and located at the desired Horsely-Clarke coordinate points as will appear in greater detail hereinafter.

Figure 2:
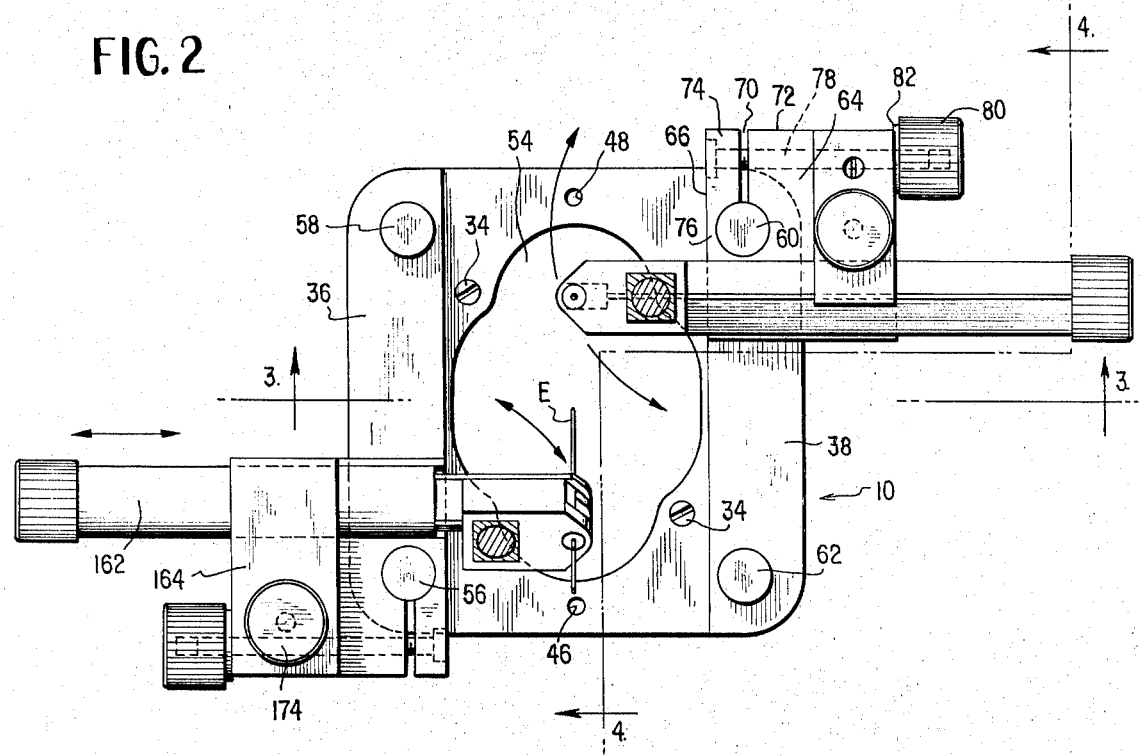
FIG. 2 is a plan view, partly in section, showing an assembled instrument and illustrating two electrode assemblies in place.
Figure 3:
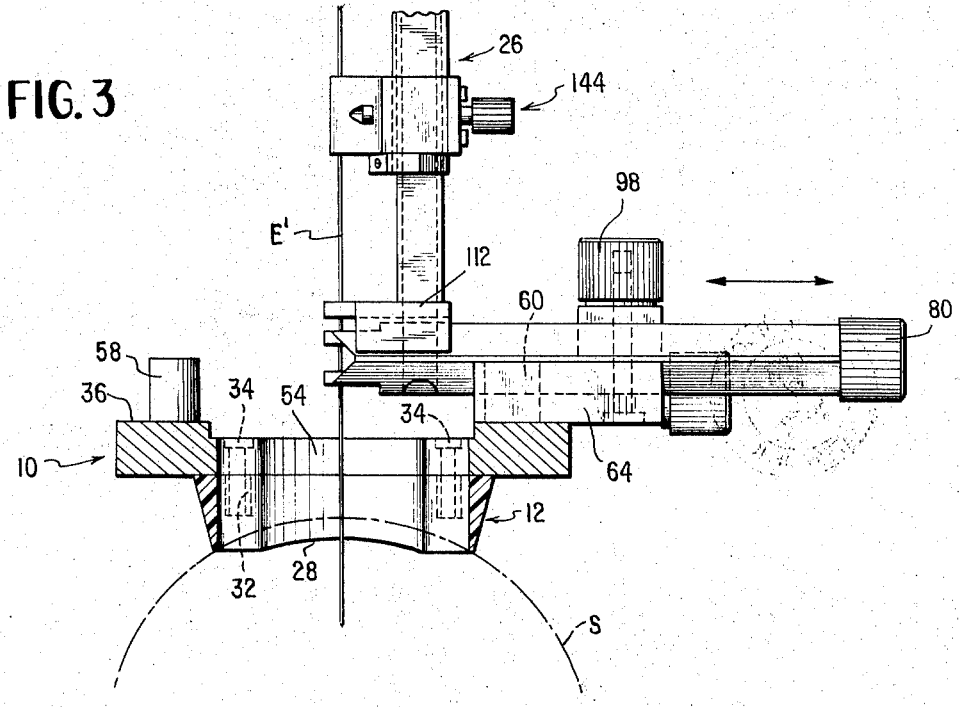
FIG. 3 is an enlarged vertical section taken substantially along the plane of section line 3—3 in FIG. 2 and illustrating one type of sliding or radial arm.

As is shown in FIG. 3, the bottom edge 28 of the adapter 12 is suitably contoured to seat upon the skull S of the research animal with the dome of the skull protruding upwardly somewhat into the confines of the adapter 12. The adapter may be constructed of suitable acrylic material of the type used by the dental profession and is suitably affixed directly to the exposed skull by any of the usual techniques involving acrylic material bonding the adapter around its lower peripheral edge to the dome of the skull. The upper surface 30 of the adapter is flat except for cut-outs T to receive the usual terminal boards, see particularly FIG. 1, and imbedded in the acrylic material of the adapter and extending substantially flush with the upper surface 30 thereof are a plurality of threaded bushes 32 adapted to receive the fasteners 34 as shown in FIGS. 2 and 3 securely to affix the platform or headpiece 10 the the adapter 12. For this purpose, the lower surface of the headpiece 10 is flat and seats firmly and uniformly upon the top surface 30 of the adapter 12.

At this point, it will be understood that standard and conventional stereotaxic frame techniques are employed initially in locating the headpiece 10 and adapter 12 in properly oriented and predetermined relationship with respect to Horsely-Clarke coordinates such that the upper surface portions 36 and 38 of the platform 10 lie in the $x,y$ plane and perpendicular to the $z$ or vertical coordinate axis. Moreover, the plane defined by the upper surface portions 36 and 38 is so positioned as to be at a selected and known Horsely-Clarke vertical axis intercept. Also, when the headpiece and adapter assembly are finally affixed rigidly to the animal's skull, it is preferred that the fore and aft center line 40 of the gridplate 14 is located in the $x,y$ plane and with one of the transverse lines located in the $x,y$ plane. The intercept point of these two planes (i.e., origin of the $x,y$ axes) on the upper surface 42 of the gridplate 14 automatically is positioned correctly as determined by the stereotaxic frame. The thickness of the gridplate 14 is the same as the depth of the recess 44 in the top surface of the platform 10 within which the gridplate 14 fits, so that the upper surface 42 of the gridplate 14 is flush with and coplanar with respect to the surfaces 36 and 38 whereby it, like the surfaces 36 and 38, forms an index for the instrument.

It is a particular feature of this invention that the gridplate 14 is removable for purposes hereinafter more apparent and in order to assure initial precise location of the gridplate 14 and subsequent replacement of the gridplate in the same location, the platform 10 is provided with dowel pin openings 46 and 48 aligned respectively with the guide openings 50 and 52 in the gridplate so as to receive suitable dowel pins positively and precisely locating the gridplate 14 with respect to the platform or headpiece 10.

It is also well to establish at this point that a major portion of the skull of the research animal which is enclosed within the adapter 12 is removed so as to expose the dura or brain of the research animal so that, for the researcher, there is direct visual as well as physical access to the animal's brain through the opening 54 in the platform 10. It will be appreciated that the opening 54 is unusually large so that the adapter 12 encompasses a large portion of the research animal's head or skull.

The platform 10 is provided with four vertical corner posts of cylindrical configuration as is indicated by the reference characters 56, 58, 60 and 62 in FIG. 1, which posts are adapted to receive the swivel posts such as those indicated by the reference characters 16 and 18 in FIG. 1. Two types of swivel posts are utilized for respective types of sliding arms 20 and 22 but the two types are essentially the same.

For use with a radial or sliding arm of the type having a square shank as indicated with respect to the arm 22 in FIG. 1, the swivel block 18 consists essentially of a square or rectangular cross-sectional block 64 provided, adjacent one side edge 66 thereof, with a vertical bore 68 and with a vertical slot 70 leading inwardly from an adjacent side edge 72 to intercept the bore 68 to define an ear 74 joined to the main block 64 only through the relatively narrow portion as indicated by the reference character 76 formed by the surface defining the bore 68 and the associated side edge 66. As will be seen in FIG. 2, the ear 74 is provided with a bore and counterbore, the former of which is internally threaded and in alignment therewith, the remainder of the block 64 is provided with a through bore. Within the threaded bore portion in the ear 74, a threaded fastening element 78 is disposed and same is of such length as projects beyond the opposite side of the body 64 for receiving the nut member 80 as shown. Thus, by manipulating the nut 80, the bore 68 is allowed to open up so as to receive an associated post such as the post 60 as shown whereafter the nut is tightened to spring the ear 66 positively to clamp the swivel block to the associated post 60. A suitable teflon washer 82 may be interposed between the nut 80 and the associated side surface of the block 64.

The swivel block 18 is provided with a V-shaped trough 84 within which the sliding arm 22 is received and seated. A separate clamping block member 86 is associated with the trough 84 having, for this purpose, an overhang or ledge portion 88 the undersurface of which is adapted to seat and engage firmly on the upper beveled edge 90 of the shank of the arm 22, the angular face 92 of the clamping member 86 preferably being located in somewhat spaced relationship to the corresponding face of the shank of the arm 22. The member 86 is provided with a vertical guide bore 94 to receive an upstanding guide pin threadedly engaged within and upstanding from the upper face of the member 64 and the member 86 is provided with a further vertical bore freely passing the stud 96 anchored in the member 64. The manually engagable nut 98 is engaged upon the upper end of the stud 96 and serves to urge the member 86 firmly into engagement with the aforesaid beveled edge 90 of the arm 22.

The free end portion of the arm 22 is bifurcated to present the upper and lower portions 100 and 102 thereof and in this respect both of the arms 22 and 20 are identical, see particularly FIGS. 5–8. The free end portion of each arm is provided with a vertical bore through the bifurcations thereof which respectively receive the guide bushings 104 and 106 having internal dimensions freely but snugly to pass the electrode as hereinafter described. A second vertical bore 108 is provided through each arm adjacent the free end portion thereof and each also is provided with a longitudinal through bore 110. Moreover, each of these portions of the arms 20 and 22 are of square cross section and both of the electrode drive assemblies 24 and 26 are provided with downwardly facing V-shaped foot portions 112 adapted to seat in straddling relationship and in face-to-face contact with the upwardly facing side surfaces of the respective arms 20 and 22. The lower end portion of each drive assembly 24 and 26 is also provided with a nose 114 which, when the devices are operatively assembled, projects into the associated bore 108 and is provided with a cam surface bore 116 of somewhat smaller diameter than the longitudinal bores 110.

Locking rods or bars are associated with each of the radial arms 20 and 22, enlarged headed ends of which are indicated by reference characters 118 and 120 in FIG. 1 and each has an elongate cylindrical shank portion 122 terminating in an eccentric cam portion 124. The eccentric portions are adapted to engage within the cam bores 116 when the parts are operatively associated as for example is shown in FIG. 7 so that slight rotation of the rod 122 in each case will cause the associated foot portion 112 to press downwardly in firm engagement with the associated portion of the radial or sliding arm.

Figure 7:
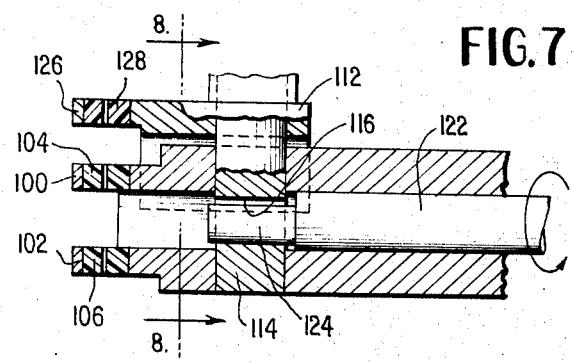
FIG. 7 is a view similar to FIG. 5 but showing the parts in operative position and the locking rod or bar in place.
Figure 8:
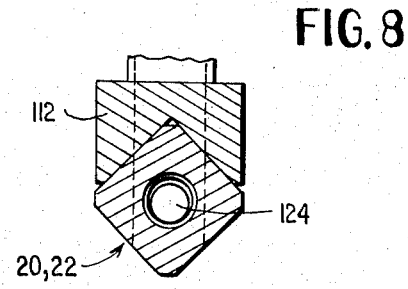
FIG. 8 is a vertical section taken substantially along the plane of section line 8—8 in FIG. 7.

FIG. 7 shows a further feature of the invention wherein the foot portion 112 of each probe drive 24 and 26 is provided with an overhang 126 provided with a bore in alignment with the bore through the bifurcations 100 and 102 and which receives a guide bushing 128 aligned with the guide bushings 104 and 106. Preferably, the internal diameter of the bushing 128 is slightly larger than that of the bushings 104 and 106 to prevent binding on the electrode. However, the fit is snug enough so as positively assures that the electrode will be accurately supported at three spaced points so that when it is plunged, it will follow the true and correct path. The guide bushings as well as the electrode clamp hereinafter described are made of material having high dielectric strength so as to minimize interelectrode capacitance.

The two electrode drive assemblies 24 and 26 shown in FIG. 1 are essentially the same except that the drive assembly 26 is of greater length than is the assembly 24. Each includes a lower portion 130 integrally joined with its foot portion 112 and to its nose portion 114, such lower portion being of rectangular and preferably square profile having Horsely-Clarke graduations on one face as indicated. The lower portion 130 is hollow.

The upper portion 132 is snugly and slidably telescoped over the lower portion 130 and it too is provided with graduations 134 on one face, as shown. The lower extremity of the upper portion 132 is provided with a stop surface member 136 for purposes presently apparent and rotatably mounted at the upper extremity of the upper portion 132 is a rotatable knob 138. The knob 138 carries a lead screw projecting downwardly longitudinally within the assembly and engaging with a nut fixed to the upper extremity of the lower portion 130 whereby rotation of the knob 138 will effect longitudinal movement of the upper portion 132 with respect to the lower portion 130. The collar portion 140 is fixed to the upper extremity of the portion 132 and is provided with an index mark cooperative with the graduations 142 on the circumference of the knob 138 in the manner of a micrometer.

Each probe or electrode drive carries a clamp assembly such as is indicated by the reference character 144. Each clamp includes a main body portion 146 of generally U-shaped configuration snugly but slidably receiving the opposite side surfaces of the upper portion 132 of the probe drive and presenting a laterally projecting first jaw 148. A second jaw member 150 is carried by the member 146 and the two jaw members present a clamping space 152 therebetween so as to clamp an electrode therebetween, such space being aligned with the openings through the several bushings 128, 104 and 106.

On the rear side of each clamp, there is a bridging plate 154 located on one of the legs of the U-shaped body portion 146 by means of dowell pins 156 and a threaded stud anchored in the second jaw member 150 passes through the same leg and outwardly through the bridging plate 154 for receiving the nut 158 whereby the jaw member 150 selectively may be loosened to be moved outwardly away from the end face of the jaw member 148 whereafter tightening of the nut 158 will effect the clamping action on the electrode. The other leg of the U-shaped body member 146 has a stud anchored therein which passes through the bridging plate and receives the nut 160 which serves respectively to press the bridging plate 154 against the associated side of the upper portion 132 whereby to lock the body of the clamp 144 at a selected longitudinal position on the upper portion 132 or to release it permitting the clamp 144 and the electrode clamped thereto to be plunged longitudinally downwardly until the clamp engages the stop surface 136.

The arm assembly 20 is characterized by the fact that its shank portion 162 is of circular cross section and the swivel block assembly 16 associated with this type of radial arm differs only slightly from the construction described in conjunction with the swivel block assembly 18. Principally, the difference is that the trough in the swivel block assembly 16 which receives the shank 162 of the arm is of arcuate cross section and that the clamping portion 164 is integral with the main body portion 166 of the swivel block. A continuation of the trough 168 through the portion 164 leaves a narrow waist portion 70, see particularly FIG. 4, connecting the portions 164 and 166 and the fastener 172 anchored in the portion 166 projects upwardly through the clamping portion 164 and receives the nut member 174 for effecting the clamping action on the arm assembly 20. The vertical bore 176 and slot 178 are formed in the same fashion as is previously described in conjunction with the swivel block 18 and the fastener 180 likewise is the same and receives the clamping nut 182.

Figure 4:
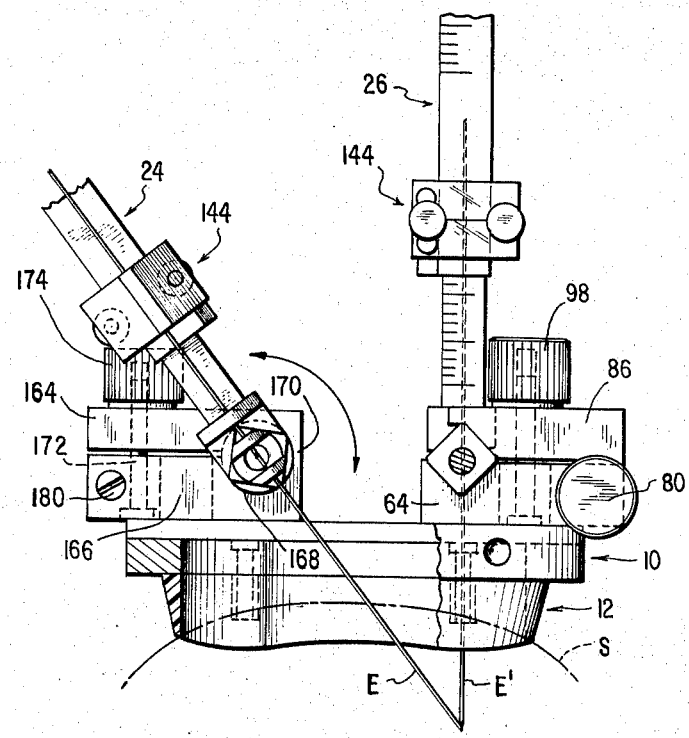
FIG. 4 is a vertical section taken substantially along the plane of section line 4—4 in FIG. 2 and illustrating the angularly adjustable type of electrode assembly and also one possible manner of its usage in conjunction with the vertical electrode assembly.
Figure 5:
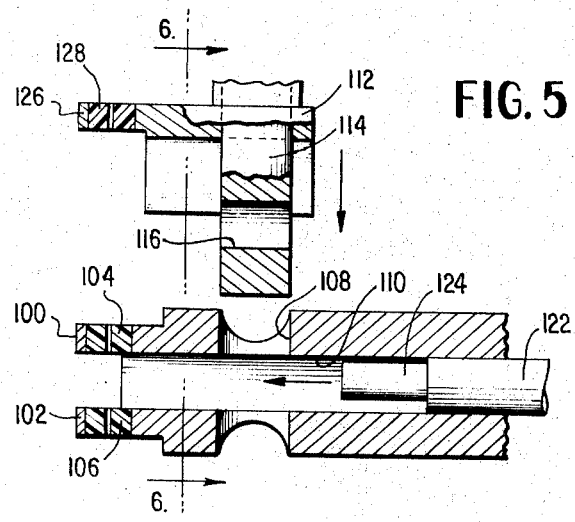
FIG. 5 is an enlarged sectional view taken through the end of a radial arm and a corresponding foot portion of an electrode drive member and illustrating the manner in which these parts are assembled and disassembled with respect to each other.
Figure 6:
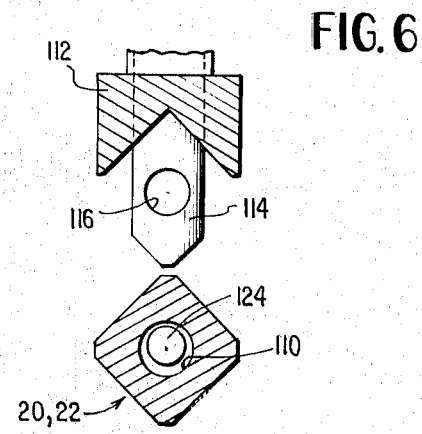
FIG. 6 is a vertical section taken substantially along the plane of section line 6—6 in FIG. 5.

The arm assembly 20 is capable of being fixed in a desired rotational position with respect to the swivel block 16 as is clearly shown in FIG. 4 so that the electrode E may be disposed at an acute angle with respect to the vertical Horsely-Clarke axis. FIG. 4 illustrates one reason for the desirability of such an arrangement. In FIG. 4, the electrode E' is associated with a non-rotatable arm assembly 22 and thus is disposed vertically whereas the electrode E is disposed in angular position as shown so that when the two electrodes are plunged and located at the desired Horsely-Clarke coordinate points, they are closely spaced or touching, as may be desired. Obviously, with electrodes which are only vertically disposed, a definite limitation exists as to the closeness of spacing which may be attained therebetween. Moreover, an electrode may be desired to be placed at an angular position so as to avoid passing it through an undesired region of the brain, or to miss an artery, or the like.

Figure 11:
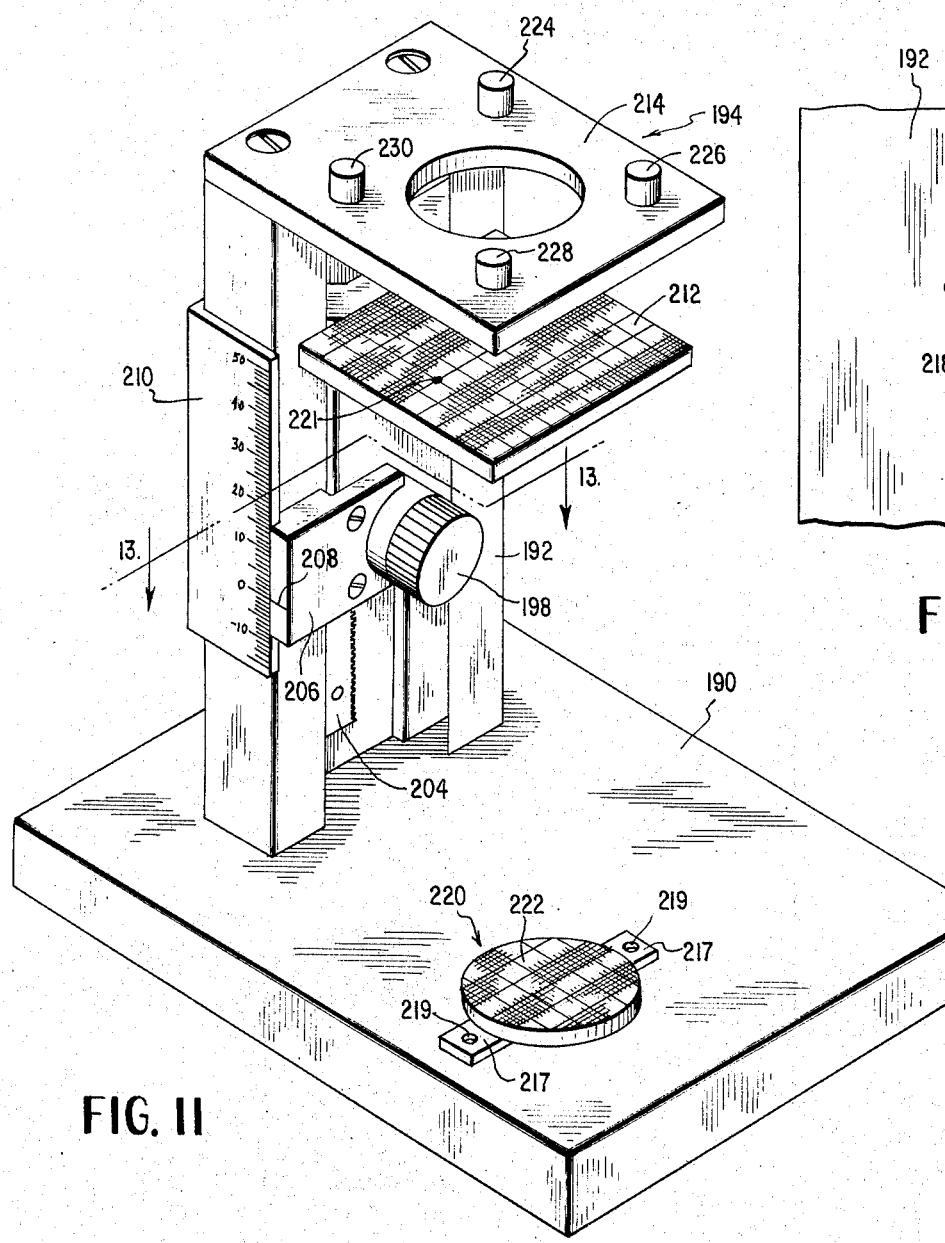
FIG. 11 is a perspective view showing a reference table instrument utilized in conjunction with the present invention.
Figure 12:
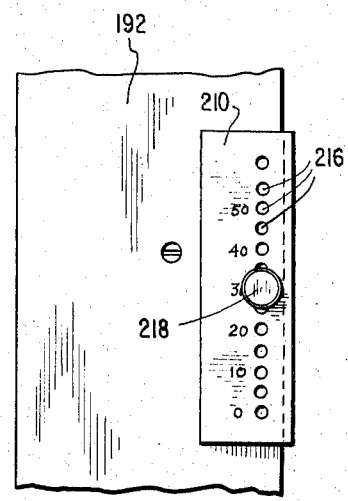
FIG. 12 is a partial rear view of the assembly in FIG. 11.
Figure 13:
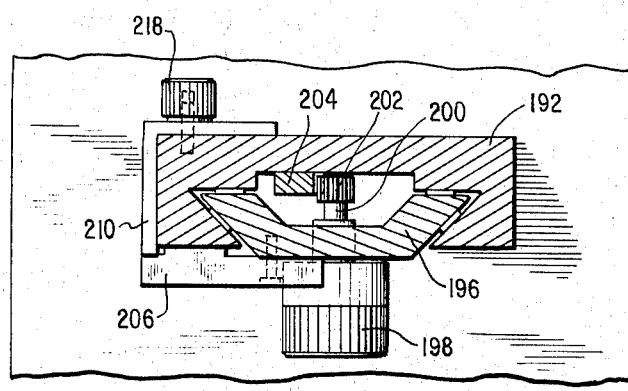
FIG. 13 is a horizontal section taken substantially along the plane of section line 13—13 in FIG. 11 illustrating certain details of the reference instrument.

To illustrate the manner in which probe drive adjustments are made so as to achieve location of the electrode tip at the desired Horsely-Clarke coordinate point, reference is had to FIGS. 11–13. These Figures illustrate a reference instrument which includes a base 190 having an upstanding pedestal 192 which mounts, in overhanging relationship to the base 190, a reference platform member indicated generally by the reference character 194. As may be seen in FIG. 13, the pedestal 192 forms a way for a vertical slide 196 which, at its upper end, mounts a gridplate reference member 198 which may be racked up and down to a desired position by means of the control knob 198. The control knob 198 has a shaft 200 fixed to it which carries a pinion gear 202 in engagement with the rack 204 fixed to the pedestal 192, as is shown in FIG. 13. Fixed to the forward face of the slide 192 is an indicating block 206 having an indicator line 208 thereon which cooperates with a scale member 210 to indicate, in Horsely-Clarke vertical axis coordinates, the relative position between the upper surface 212 of the reference gridplate 198 with respect to the upper surface 214 of the reference platform 194. As is shown more clearly in FIG. 12, the scale member 210 is of L-shaped configuration to fit around one corner edge of the pedestal 192 and is provided with a series of vertically spaced openings 216 selectively to receive a stud projecting outwardly from the pedestal and receiving a nut member 218 thereon whereby the scale 210 may be located at the required vertical position relative to the pedestal 192 and, therefore, to the upper surface 214 of the reference platform 194. The reason for this is to allow the scale 210 to be adjusted initially to a position related to the vertical axis intercept point at which the upper surface of the chronic headpiece platform is attached with relation to the research animal's skull so that, correspondingly, the scale may be set such that the indicator line 208 reads directly in the Horsely-Clarke vertical axis intercept as marked on the scale. Alternatively, the series of openings 216 may be replaced by a continuous slot so as to allow infinitely variable adjustment. To position the scale 210 properly, the reference gridplate 198 is racked fully to the uppermost position wherein it is against the undersurface of the reference platform 194 and the scale is set so that the corresponding vertical axis intercept is indicated on the scale 210 is at that value corresponding to the height at which the upper surface of the platform 10 was affixed to the research animal.

Since the holes 216 are spaced apart five increments on the Horsely-Clarke scale, it will be necessary for the researcher to affix the platform 10 on the animal at a Horsely-Clarke value (i.e., 25, 30, 35 etc.) to which the scale 210 may be set. If the holes 216 are replaced by a slot, this constraint is not necessary since the scale 10 may then be set to whatever value is necessary. The reference gridplate 198 shown in FIG. 11 is a standard one for use with that type of chronic headpiece assembly which has, unlike that shown, a fixed and permanent gridplate located between an adapter and the undersurface of the platform or headpiece. In such arrangements, the entire assembly including adapter, gridplate and the chronic headpiece assembly is permanently fixed to the animal and it is therefore necessary to drill through this gridplate at desired points for insertion of electrode, through any underlying acrylic material filling between the gridplate and the skull, and through the research animal's skull for access to his brain. Moreover, visual and physical access to the animal's brain is not had with such an arrangement. With a gridplate construction which is removable and positioned as shown according to the present invention, the standard reference instrument shown in FIG. 11 must be supplemented with the gridplate addition member 220 which is removably but precisely located upon the upper surface 212 of the reference gridplate 198 so that when the reference gridplate 198 is racked upwardly to its uppermost position, the upper surface 222 of the auxiliary gridplate 220 lies flush with the upper surface 214 of the reference platform 194, the same as the relationship between the removable gridplate 14 in FIG. 1 with respect to the surfaces 36 and 38. To locate the member 222 properly, same is provided with diametrically opposed ears 217 having counter-bored openings 219 which mate with and accurately align to corresponding openings 221 in the member 198. Suitable fasteners locate and fix the member 220 in place, it being understood that the bottom surface of the reference member 198 is provided with recesses for clearing the ears 217.

The reference platform 194 is provided with four vertical posts 224, 226, 228 and 230 located precisely in the positions of the posts 56, 58, 60 and 62 of the chronic headpiece assembly 10. The reference instrument 11 is used to allow an angularly driven electrode to reach the desired Horsely-Clarke coordinate point both in the $x,y$ plane and in proper vertical axis position. To do this, a swivel plate 16 and associated rotatable radial arm 20 is positioned on one of the posts 224–230 with the reference gridplate positioned at the desired vertical axis position to which the angulated electrode is to be driven. The electrode is then so positioned that its tip reaches the upper surface 222 of the auxiliary gridplate 220 attached to the reference gridplate 198 and at the proper $x,y$ coordinate point to which the electrode is to reach within the animal's brain. The electrode is then retracted, with the swivel plate and radial arm remaining in their locked positions, the reference gridplate assembly is racked to the fully uppermost position so that the surface 222 is flush with the surface 214 and the electrode tip is lowered back to the surface 222 and the coordinate points are noted so that the swivel block may then be transferred to a corresponding post on the headpiece 10 with the tip of the electrode located at the noted $x,y$ points on the removable gridplate 14 which is now in place, whereafter the plunging of the electrode to the proper depth will assure that the $x,y$ plane position of the electrode tip is also correct.

Figure 9:
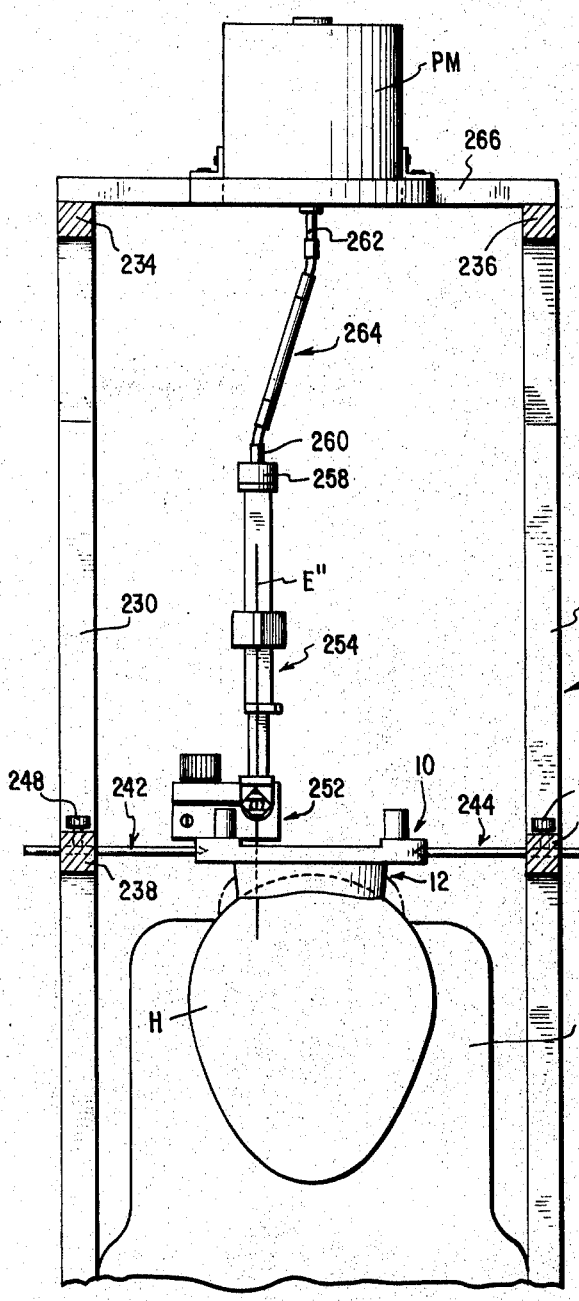
FIG. 9 is a vertical section taken through a frame assembly and associated power input assembly for an electrode drive.
Figure 10:
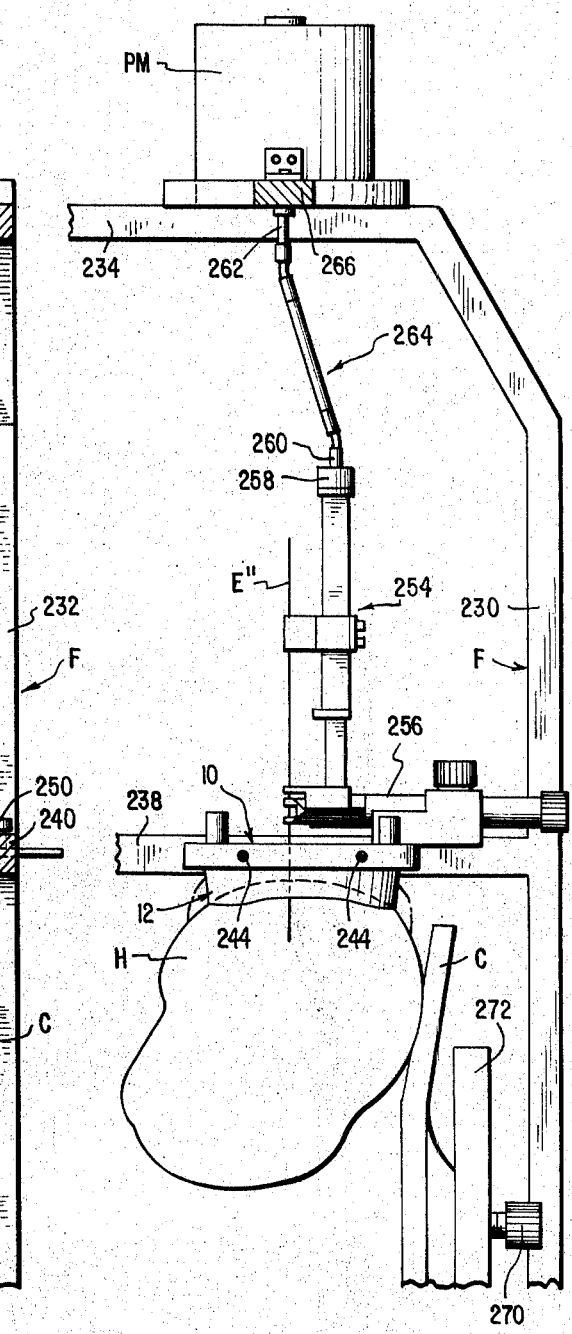
FIG. 10 is a side elevational view of the assembly as shown in FIG. 9.

A researcher often will desire to take a plurality of regions within a known area or region of the brain in which the precise spacing in the direction of longitudinal movement of the electrode between readings must be known. The assembly as shown in FIGS. 9 and 10 provides a convenient and rapid manner of so doing. This assembly comprises a rigid framework F having a chair C rigidly affixed to it within which the animal is placed. The frame includes uprights 230 and 232 having at their upper ends the bridge pieces 234 and 236 extending forwardly to further uprights (not shown) the hole forming a very rigid framework. Lower frame member 238 and 240 respectively carry two pairs of locating rods 242 and 244 which have conical tip portions and are adapted to be received in corresponding pairs of blind bores 246 at the opposite sides of the platform, see particularly FIG. 1. Set screws 248 and 250 are associated with these locating rods and they are set so that the headpiece 10 is firmly and non-movably located with respect to the frame F, correspondingly to hold the animal's head H extremely rigidly. A swivel block 252 is mounted on one of the mounting swivel pins on the platform 10 and a probe drive assembly 254 is affixed thereto through the associated radial arm assembly 256. The probe drive 254 preferably has an extremely fine lead screw and a large control knob 258 having graduations in five micron steps and a pulse motor drive is utilized to drive the electrode E'' at the desired incremental steps. For this purpose, the knob 258 is provided with a centrally disposed and internally splined socket 260 which is connected to the output shaft 262 of the pulse motor PM by means of the dual universal joint shaft 264, the lower extremity of which is provided with an externally splined shaft for reception within the socket 260. The pulse motor is rigidly affixed to a cross member 266 extending between the bridge portions 234 and 236 and is aligned substantially centrally above the animal's head H so as to minimize the angular deflection of the drive shaft 264 despite the x,y coordinate at which the electrode E'' is located with respect to the gridplate 14 (now removed). The angular resolution of the pulse motor PM and the pitch of the lead screw associated with the probe drive 254 are such as to effect longitudinal displacement of the electrode E'' in one micron steps.

The chair C is capable of vertical adjustment so as properly to position the animal and for this purpose a plurality of locking bolts 270 serve rigidly to affix the chair to appropriate levels 272 of the frame as shown in FIG. 10.

In conclusion, it should be noted that once the electrode or electrodes are properly positioned in the animal's brain, they are cut off to the desired lengths and connected to a printed circuit board connector assembly located within the notch T in the top edge of the adapter 12 (as has become conventional practice in this art), the headpiece 10 removed entirely and replaced by a cover plate (not shown) held in position by fasteners associated with the threaded bushings 32.

It should also be noted that by providing a reference surface or surfaces 36,38 on the platform having the posts 56, 58, 60 and 62 associated therewith, and by causing the probe drive assembly, and more particularly the swivel block portions thereof, to seat upon the reference surface, a simple yet fully accurate and reproducible means is provided for positively locating the electrode or probe guide at the end of the radial arm so as to align with a desired Horsely-Clarke x,y intercept point. When a rotatable radial arm is to be employed to position an electrode or probe for angular penetration, the reference instrument of FIG. 11 is employed to allow the probe guide to be aligned angularly with the necessary x,y intercept point such as will assure that the probe will reach the desired point in the animal's brain. In this case, the required x,y point is determined at the reference instrument and simply translated to the platform 10.

What is claimed is:

1. An open access stereotaxic platform assembly comprising, in combination:

a plate member having a generally centrally disposed access opening for open access to the brain of an animal with which the platform is associated;

means for rigidly fixing said plate member to an animal's skull in predetermined relation with respect to Horsely-Clarke coordinates;

said plate member presenting reference surfaces on either side of said access opening and having a top surface between and recessed below said reference surfaces in surrounding relation to said access opening, and a plurality of vertical posts on each of said reference surfaces;

a gridplate seating upon said top surface and bridging between said reference surfaces completely to close said access opening and presenting an upper indexing surface; and means for removably fixing said gridplate on said top surface to seal said access opening and with said upper surface of the gridplate being located at a known point on the Horsely-Clarke vertical coordinate.

2. An open access stereotaxic platform assembly as defined in claim 1 including a swivel block on one of said posts, a radial arm carried by said swivel block and overlying said access opening, and a probe drive carried by the end of said radial arm.

3. An open access stereotaxic platform assembly as defined in claim 2 wherein said radial arm is of noncircular cross section so as to position said probe drive parallel to the vertical Horsely-Clarke coordinate.

4. An open access stereotaxic platform assembly as defined in claim 2 wherein said radial arm is of circular cross section so as to position said probe drive at acute angles with respect to the vertical Horsely-Clarke coordinate.

5. An open access stereotaxic platform assembly as defined in claim 3 including a second swivel block on another of said posts, a second radial arm carried by said second swivel block, and a second probe drive carried by the end of said second radial arm, said second radial arm being of circular cross section so as to position said second probe drive at acute angles with respect to the vertical Horsely-Clarke coordinate.

* * * * *